Patented Aug. 15, 1933

1,922,153

UNITED STATES PATENT OFFICE 1,922,153

AMYL CRESOLS AND PREPARATION THEREOF

Walter G. Christiansen, Glen Ridge, and William A. Lott, Newark, N. J., assignors to E. R. Squibb & Sons, New York, N. Y., a Corporation of New York No Drawing. Application January 15, 1932
Serial No. 586,956

2 Claims. (Cl. 260—154)

This invention relates to amyl cresols, and has for its object the provision of (1) an advantageous method of preparing amyl cresols generally and (2) a bactericidally active mixture of isomeric amyl cresols.

Essentially the method of this invention comprises condensing a cresol with an amylene, such cresol and such amylene being chosen as correspond to the respective constituents of the amyl cresol desired. If commercial amylene, a mixture of isomers, is used, there results a mixture of isomeric amyl cresols, characterized by bactericidal activity of a high order.

For example, to 400 cc. of sulfuric acid cooled to 15° C. by means of carbon-dioxide ice in alcohol, 200 g. of ortho-cresol dissolved in 400 cc. of ether is added, mechanical agitation being used and the temperature being kept below —5° C. A solution of 200 g. of commercial amylene in 200 cc. of ether is added in small portions during the course of half an hour, and the mixture is thereafter stirred for two hours, a temperature of between —15° and —5° C. being maintained throughout. Now the temperature is allowed to rise to 0° C. and the reaction mixture is poured into several times its weight of crushed ice. The ether layer is separated out and washed with dilute sodium bicarbonate solution, and the phenolic compounds are extracted with ten-per-cent sodium hydroxide solution. Acidification and cooling of the alkaline extract follow, then extraction with ether, evaporation to remove the ether, and distillation in vacuo. After several distillations, approximately 65 g. of the isomeric amyl ortho-cresols are collected at between 125° and 128° C. under a pressure of between 10 and 11 mm.

It will be understood that the embodiment described above is merely illustrative and not limitative of the invention, which may assume various other forms—for instance as to the particular cresols and amylenes and procedures employed—within the scope of the appended claims.

We claim:

1. The method of preparing amyl cresol that comprises condensing a cresol with an amylene at a temperature of not more than about 10° C. in the presence of sulfuric acid.

2. The method of preparing a mixture of isomeric amyl cresols that comprises condensing a cresol with commercial amylene at a temperature of not more than about 10° C. in the presence of sulfuric acid.

WALTER G. CHRISTIANSEN.
WILLIAM A. LOTT.